United States Patent [19]

Enderle et al.

[11] Patent Number: 5,041,806
[45] Date of Patent: Aug. 20, 1991

[54] ELECTROMAGNETIC HOLDING DEVICE

[75] Inventors: Eckhard Enderle, Aalen-Dewangen; Michael Wirth; Bernd Baier, both of Aalen, all of Fed. Rep. of Germany

[73] Assignee: Carl-Zeiss-Stiftung, Heidenheim, Fed. Rep. of Germany

[21] Appl. No.: 550,029

[22] Filed: Jul. 9, 1990

[30] Foreign Application Priority Data

Jul. 7, 1989 [DE] Fed. Rep. of Germany ....... 3922297

[51] Int. Cl.$^5$ .............................................. H01F 7/04
[52] U.S. Cl. .................................... 335/295; 33/561; 29/568
[58] Field of Search ............... 335/229, 230, 288, 290, 335/289, 295; 33/561; 29/568

[56] References Cited

U.S. PATENT DOCUMENTS 4,637,119 1/1987 Schneider et al. ............. 335/295 X

Primary Examiner—George Harris
Attorney, Agent, or Firm—Walter Ottesen

[57] ABSTRACT

The invention is directed to an electromagnetic holding device which includes one or more permanent magnets and an electromagnet. The holding device releases and pulls in units which are held thereon. During an exchange operation, the field of the electromagnet is superposable on the field of the permanent magnet either in the same direction or in the opposing direction and thereby intensifies or neutralizes the holding force. In order to provide the smallest possible assembly volume and lowest weight with the highest possible holding force, the permanent magnet is disposed ahead of the electromagnet when viewed with respect to the exchange face. When the exchange part is pulled in, the field lines of the electromagnet run in a completely closed flux-conducting part which is not interrupted at any location by an air gap.

11 Claims, 3 Drawing Sheets

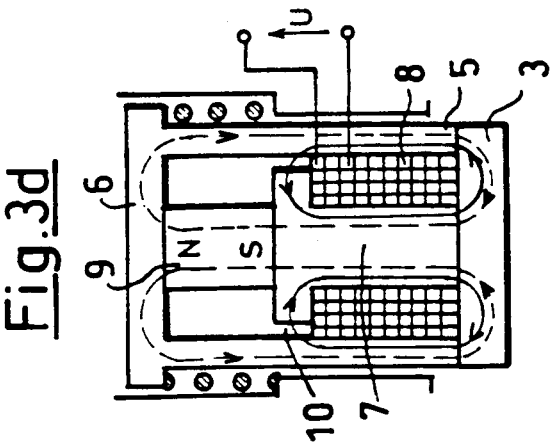
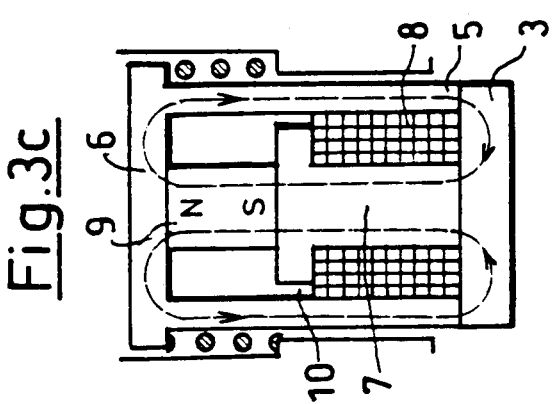
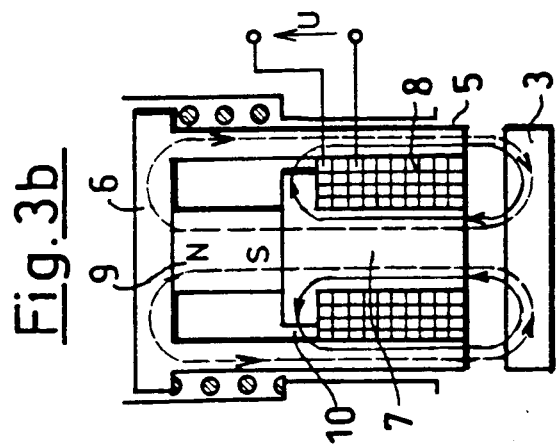
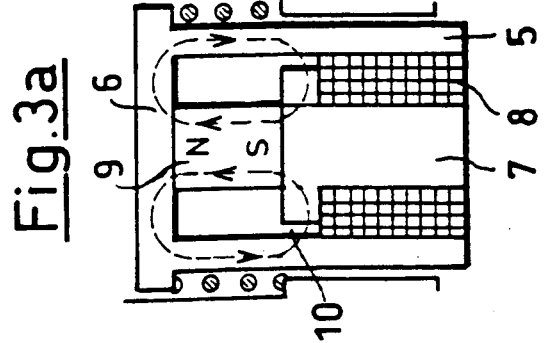
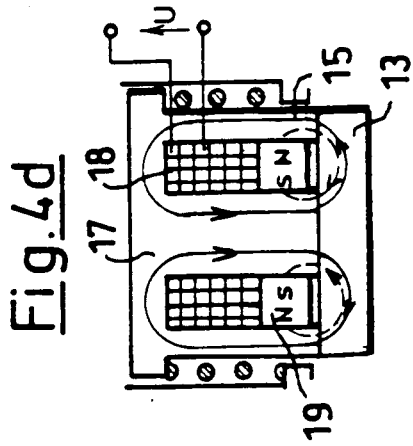
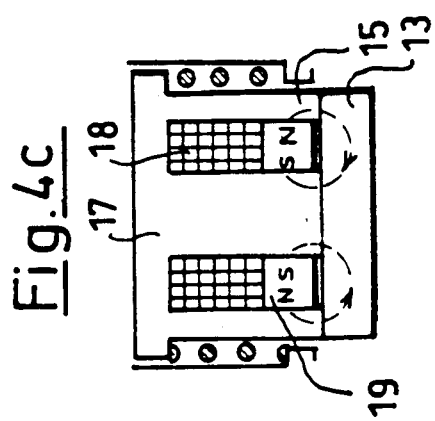
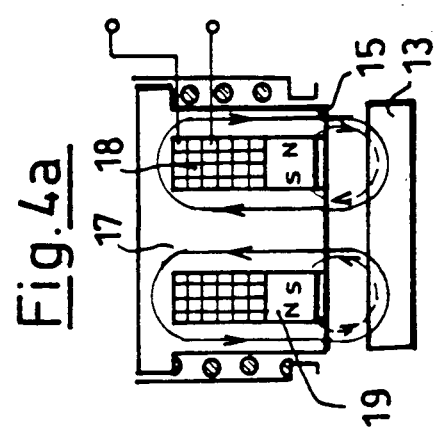
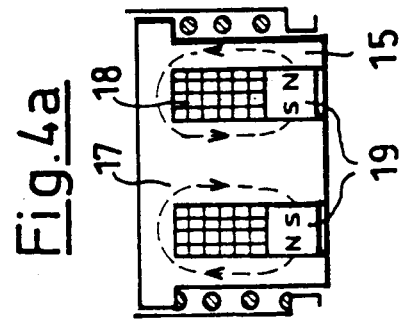

ELECTROMAGNETIC HOLDING DEVICE

FIELD OF THE INVENTION

The invention relates to a holding device for exchange parts having one or more permanent magnets and an electromagnet with the field of the electromagnet being superposable on the field of the permanent magnet during the exchange operation.

BACKGROUND OF THE INVENTION

Such holding devices are used, for example, for lifting tools or transport equipment in order to move workpieces. U.S. Pat. No. 4,649,623 discloses a probe tip or stylus which can be held in arrangements of this kind and which are exchangeable in the probe head of coordinate measuring apparatus.

In the above-mentioned arrangements, the electromagnet weakens or intensifies the field of the permanent magnet during the exchange operation so that the part being held can be easily removed or can be pulled automatically onto the exchange face. The part being exchanged is held exclusively by the force of the permanent magnet in the time between the exchange operations.

The electromagnetic holding arrangements of the kind described above are usually configured in the manner disclosed in French Patent 73 03835 as well as East German Patent 127,065. According to these teachings, the permanent magnet is seated centrally in the bore of a pot-shaped flux-conducting part. The electromagnet is disposed ahead of the permanent magnets referred to the exchange face and is seated with its iron core in the flux-conducting part. A disc-shaped soft-iron part is disposed between the permanent magnet and the electromagnet in such a manner that a narrow gap remains between the outer side of the soft-iron part and the inner side of the pot-shaped flux-conducting part. This gap defines a short circuit path through which the flux of the electromagnets is guided so that it must not penetrate the permanent magnet.

This gap, however, defines a relatively high resistance for the flux of the electromagnet. The coil must therefore be essentially overdimensioned so that the field intensity required for neutralizing the flux of the permanent magnet can be achieved. This coil is relatively large and heavy. Furthermore, the coil needs relatively high electrical power which is transformed into heat and can introduce thermal problems especially for an application in measuring apparatus. Finally, the flux-conducting parts must extend with sufficient spacing in the region of the permanent magnet so that no further magnetic short circuit occurs. The volume of these known electromagnetic holding devices is therefore relatively large.

Japanese protective right 60-144914 discloses an electromagnetic holding arrangement comprising a flux-conducting part having an E-shaped section when viewed in cross section. The flux-conducting part has an annular gap in which the coil of the electromagnet as well as a permanent magnet is introduced. The poles of the permanent magnet are aligned so as to be radial referred to the axis of the magnetic field of the coil. The permanent magnet is mounted on the side of the flux-conducting part onto which the workpiece is pulled.

However, in this holding arrangement, the core of the soft-magnetic flux-conducting part is interrupted by a gap. A short circuit path extends across the base of the flux-conducting part behind the electromagnet and the gap interrupts this short circuit path for the flux of the permanent magnet so that the workpiece can be pulled into place exclusively by the permanent magnet without exciting the electromagnet. The electromagnet is only excited when the field of the permanent magnet is to be neutralized to loosen the workpiece.

The gap in the flux-conducting part however also defines a high magnetic resistance for the flux of the electromagnet. The same disadvantages mentioned above apply to this known electromagnetic holding arrangement insofar as the overdimensioning of the electromagnet is concerned.

The smallest possible weight and smallest possible assembly volume is desired if an electromagnetic holding device for exchanging a probe pin is to be built into the displaceable part of the probe head of a coordinate measuring apparatus. The total weight of the probe pin carrier including the weight of the probe pin itself and its holding device to be carried by the probe head has upper limits. For this reason, the weight for the probe pins is unavailable which was used for the holding device; that is, one is limited to a few relatively light probe pins. Furthermore, a high weight in the displaceable part of the probe head limits the dynamics of the coordinate measuring apparatus; more specifically, the permissible acceleration with which the probe head can be driven is limited. A tilting moment acts on the movable part of the probe head during acceleration and deceleration of the machine. This tilting moment must be held to a value which is so small that this movable part is not lifted out of its bearing and unwantedly simulates a touching. In addition to weight, the length of the probing device to be exchanged is a determining variable. A high weight for the holding device therefore limits the length of the probing devices which can be exchanged.

SUMMARY OF THE INVENTION

It is an object of the invention to provide an electromagnetic holding device suitable for building into the probe head of a coordinate measuring apparatus. The holding device is characterized by having the smallest possible weight and a small assembly size without reducing the holding force.

The holding device of the invention is for interchangeably holding task units each having an armature so as to permit the task unit to be held by magnetic force. The holding device includes: a flux-conducting member defining an annular gap; permanent magnetic means having a permanent magnetic field for acting on the armature of a task unit with a holding force to hold the task unit on the holding device; electromagnetic means for superposing an electromagnetic field on the permanent magnetic field when the task unit is transferred to or away from the holding device; the electromagnetic means being seated in the annular gap and the electromagnetic field defining a magnetic field axis; the permanent magnetic means defining magnetic poles and being seated in the gap so as to cause the magnetic poles to be aligned radially of the field axis; and, the armature and the flux-conducting member conjointly defining a contact engaging interface when the task unit is in position on the holding device so as to cause the flux-conducting member and the armature to define a completely closed magnetic circuit for the field lines of the electromagnetic field.

The features of the holding device of the invention make possible a reduction in weight and assembly size by more than half when compared to the state of the art described above. The flux of the electromagnet must not be conducted across a gap and instead runs in a completely closed soft-magnetic flux-conducting part when the part to be exchanged is seated. For this reason, a small light-weight coil can be used. Furthermore, the coil consumes less electrical energy so that the very disturbing thermal loss released in the coordinate measuring apparatus is likewise less.

A one-piece ring-shaped magnet having radial polarization of its magnetic field can be used as a permanent magnet with this magnet being matched with its dimensions to the annular gap of the flux-conducting part. Such radially polarized ring magnets are known. However, it is also possible to utilize a plurality of axially polarized individual magnets with radial alignment of their magnetic poles referred to the magnetic field axis of the electromagnet or of the flux-conducting part. A stronger permanent magnetic field can be generated with this embodiment since axially polarized magnets are offered having a higher magnetic field strength compared to radially polarized permanent magnets.

It is especially advantageous if the axial dimension of the coil of the electromagnet is greater than the axial dimension of the permanent magnet. In this way, the short circuit path extending behind the coil of the electromagnet has a higher resistance in the flux of the permanent magnet than the flux conducted directly via the armature of the part pulled to the holding device and the holding force of the permanent magnet acts unweakened on the part being held even after the electromagnet is switched off.

BRIEF DESCRIPTION OF THE DRAWINGS

The invention will now be described with reference to the drawings wherein:

FIGS. 3a to 3d are simplified schematics which show the operation of the holding device of FIG. 1 in different stages during the operation thereof;

FIGS. 4a to 4d are simplified schematic views which show the operation of the holding device of the invention shown in FIG. 2 for various stages during the operation thereof;

FIG. 5a is a plan view of an alternate embodiment of the electromagnetic holding device of FIGS. 2 and 4 with this plan view being in the direction of line Va—Va of FIG. 5b; and, FIG. 5b is a section view of the electromagnetic holding device of FIG. 5a taken along line Vb—Vb of FIG. 5a.

DESCRIPTION OF THE PREFERRED EMBODIMENTS OF THE INVENTION

Figure 1:
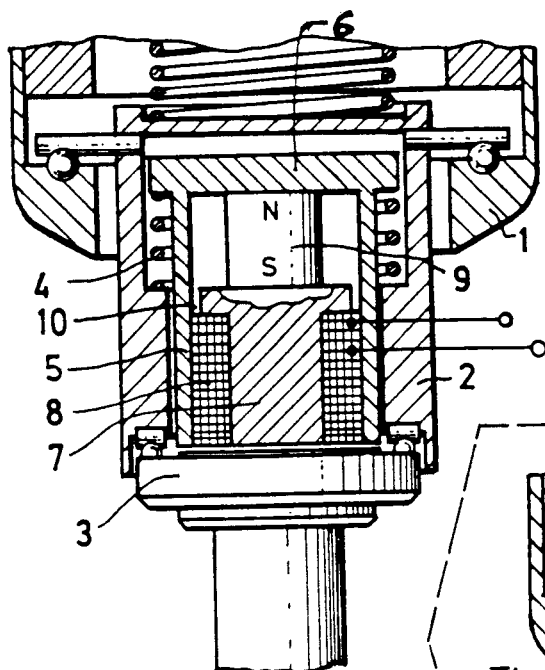
FIG. 1 is a section view taken through the displaceable part of a probe head for coordinate measuring apparatus having a built-in electromagnetic holding device according to the state of the art.

In FIG. 1, reference numeral 1 identifies the stationary part of the probe head for coordinate measuring apparatus. This probe head is of the switching type having a displaceable part 2 carrying the probe pin and pressed by a spring into a three-point bearing determining its zero position. Probe heads of this type are disclosed, for example, in U.S. Pat. No. 4,177,568 incorporated herein by reference.

An electromagnetic holding device is disposed in the displaceable part 2 of the probe head and comprises one electromagnet and a permanent magnet 9 as well as a pot-shaped flux-conducting part 5 made of soft iron. The electromagnet has a core 7 which is likewise soft magnetic. The core 7 has a side facing away from the exchange face which extends into a disc having a larger diameter. A gap 10 is disposed between the outer edge of this disc and the inner side of the outer flux-conducting part 5. This gap acts as a short circuit path for the magnetic flux of the coil 8 of the electromagnet. The permanent magnet 9 is an axially polarized magnet and is mounted centrally between the iron core 7 of the coil 8 and the base 6 of the pot-shaped flux-conducting part 5. The permanent magnet 9 is significantly smaller in diameter than the inner diameter of the flux-conducting part 5 in order to avoid magnetic short circuits.

The electromagnetic holding device is built into the displaceable part 2 of the probe head and is axially displaceable against the force of a spring 4. In the position shown, the holding device pulls the exchange plate 3 of a probe pin against a three-point bearing at the lower end of the part 2. The operation of this holding device according to the state of the art will be explained with reference to FIGS. 3a to 3d.

The starting position is shown in FIG. 3a with no probe pin mounted. In this start condition, the magnetic flux of the permanent magnet 9 runs in the base 6 of the flux-conducting part 5 and through the narrow gap 10 into the iron core 7 of the coil 8.

In FIG. 3b, the probe head has been driven to an exchange plate 3 which is shown placed ahead of the holding device. If the exchange plate 3 is to be pulled in, then the electromagnet is excited. The magnetic flux of the electromagnet is represented by the arrowed solid line. This flux of the electromagnet passes also through the gap 10 (the gap 10 acting as a short circuit path) between the flux-conducting part 5 and the iron core 7 but is there in opposition to the flux of the permanent magnet 9. However, the field intensities of the permanent magnet and of the electromagnet are in the same direction at the exchange face in the region of the soft-magnetic armature in the exchange plate 3 of the probe pin carrier and pull the armature disposed in the exchange plate 3.

After switching off the electromagnet 8, the armature with the exchange plate 3 is held exclusively by the force of the permanent magnet 9 as shown in FIG. 3c. The flux of the permanent magnet 9 now runs through the flux-conducting part (5, 6) as well as the iron core 7 and the pulled-in armature in the exchange plate 3.

To drop off the probe pin and referring to FIG. 3d, the electromagnet is excited via a voltage U poled in opposition to that in FIG. 3b. In this way, the now opposite magnetic flux of the coil 8 and the flux of the permanent magnet 9 neutralize each other in the region of the armature 3 so that the probe pin carrier drops off under its own weight from the holding device.

The holding device built in the manner described according to the state of the art has approximately a weight of 280 grams and a diameter of 35 mm and a length of 48 mm in order to exchange a probe weight of approximately 600 grams and with a holding force of 200 N. The coil transforms a relatively large quantity of electrical energy into disturbing heat loss during the in-exchange operation and the out-exchange operation.

Figure 2A:
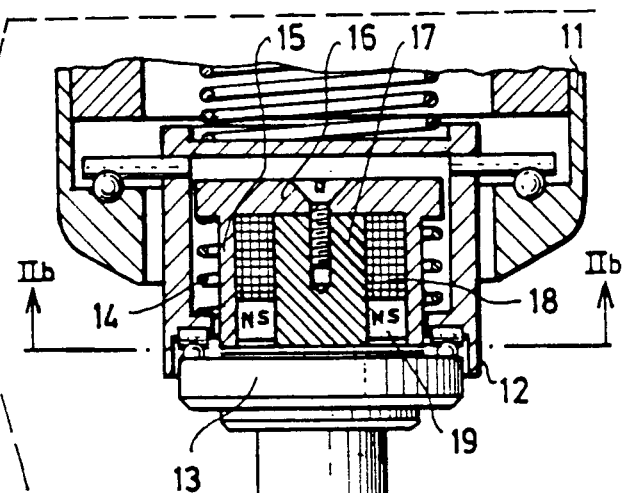
FIG. 2a is a section view taken through the displaceable part of a probe head for coordinate measuring apparatus having a built-in electromagnetic holding device according to the invention.
Figure 2B:
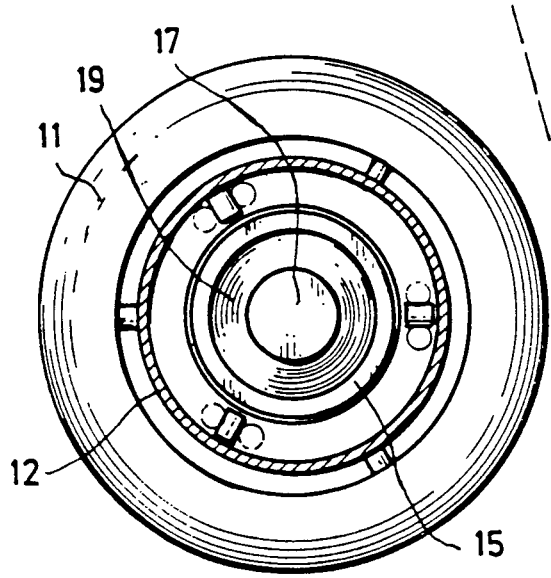
FIG. 2b a section view of the probe head of FIG. 2a taken along the line IIb—IIb of FIG. 2a in a plane perpendicular to the longitudinal axis.

This is the case only in a reduced amount for the holding device according to the invention shown in FIG. 2. In this holding device, the axially displaceable holding device is built into the displaceable part 12 of the probe head 11 and is likewise axially displaceable against the force of a spring 14. The holding device of FIG. 2 comprises an electromagnet and a ring-shaped permanent magnet 19 mounted ahead of the electromagnet when viewed with respect to the exchange face with the permanent magnet 19 having a magnetic field which is radially polarized. The iron core 17 of the coil 18 of the electromagnet is directly and threadably engaged without a gap at the base 16 of the pot-shaped flux-conducting part 15 and has a length as long as the depth of the part 15. The coil 18 of the electromagnet and the permanent magnet 19 are both seated in the annular gap conjointly defined by the part 15 and the iron core 17 and fill this gap completely. Not only is unnecessary space is avoided with this arrangement, but as will be explained with respect to FIGS. 4a to 4d, the coil itself and the electromagnet can be reduced with respect to their dimensions without a loss of the holding force.

When the exchange plate 13 with the probe pin 21 is removed, the magnetic flux of the permanent magnet 19 runs in the soft-magnetic flux-conducting parts (15 to 17) around the coil 18 as shown by the dashed line in FIG. 4a. If the probe head 11 is then positioned with its exchange face opposite the armature of the exchange plate 13 and the electromagnet is energized (FIG. 4b), then the flux (represented by the arrowed solid line) of the electromagnet displaces the opposing flux of the permanent magnet 19 in the region of the soft-iron parts (15 to 17) but superposes itself on this flux in the same direction in the region of the exchange plate 13 and thereby pulls its armature in.

After the electromagnet is switched off (FIG. 4c), the flux of the permanent magnet 19 is closed via the armature in the exchange plate 13 and no longer takes the longer path around the coil 18 of the electromagnet. The coil 18 of the electromagnet is relatively long with respect to its dimensions in comparison to the permanent magnet 19.

To release the exchange plate 13, a voltage is applied to the coil 18 of the electromagnet which is opposite compared to the voltage applied in the in-exchange operation according to FIG. 4b so that the flux of the electromagnet neutralizes the flux of the permanent magnet 19 in the region of the exchange plate 13 (FIG. 4d). The current for the electromagnet needed for this purpose can be relatively small since the loop in which the field lines of the electromagnet run is completely closed with this loop being formed by the flux-conducting parts (15 to 17) and the soft-magnetic armature. Accordingly, only half as much electrical energy is needed for an exchange operation and converted to heat loss. The coil 18 and the permanent magnet 19 can be configured so as to be smaller in size and to be of less weight. An electromagnetic holding device assembled as shown in FIGS. 2 and 4 has only a weight of approximately 130 grams and a diameter of 35 mm and a length of 20 mm compared with that shown in FIGS. 1 and 3.

Figure 5A:
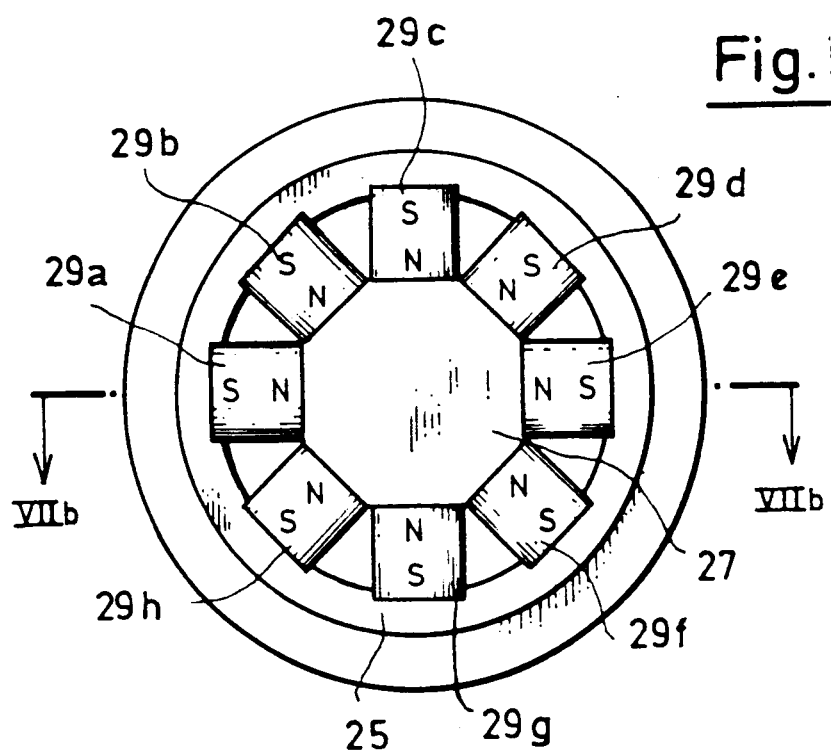
Figure 5B:
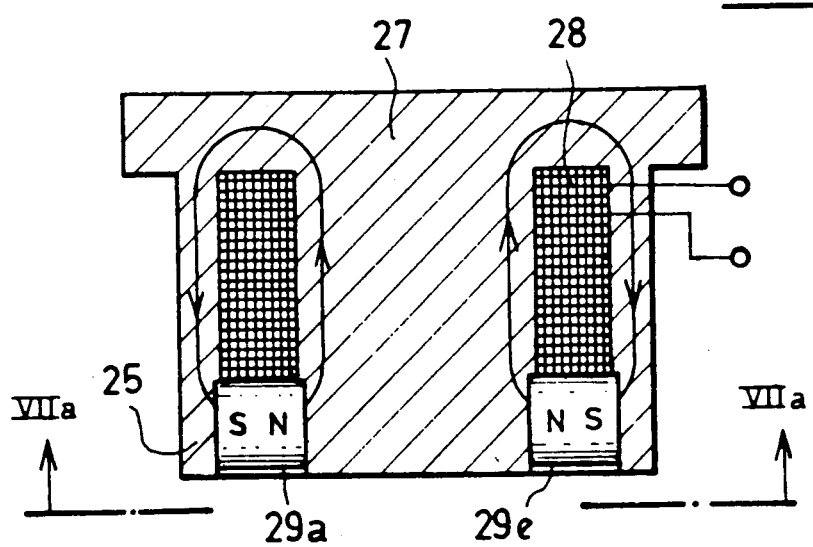

An alternate embodiment for the holding device of FIG. 2 is shown in FIGS. 5a and 5b. In this embodiment, eight individual permanent magnets (29a to 29h) are seated in the annular gap of the soft-magnetic flux-conducting part (25/27) ahead of the coil 28 of the electromagnet. These eight individual permanent magnets are in lieu of the one-piece ring-shaped permanent magnet. The permanent magnets are cylindrical axially polarized magnets which are seated in the annular gap and are arranged symmetrically about the axis of the coil with their magnet poles being radially aligned. The outer edge of the soft-magnetic core 27 and the inner side of the flux-conducting part 25 are each provided with eight planar facets at the locations at which the magnets (29a to 29h) are seated in the annular gap so that the individual magnets there lie in flat contact engagement with their respective end faces.

Although with this arrangement there is dead space in a limited amount between the individual magnets, this is outbalanced, however, by the higher field intensity which is obtained with the axially polarized individual magnets compared to the radially polarized ring-shaped magnets. Furthermore, this space can be greatly reduced by an appropriate configuration and a large number of individual magnets.

It is understood that the foregoing description is that of the preferred embodiments of the invention and that various changes and modifications may be made thereto without departing from the spirit and scope of the invention as defined in the appended claims.

What is claimed is:

1. A holding device for interchangeably holding task units each having an armature so as to permit the task unit to be held by magnetic force, the holding device comprising:

a flux-conducting member defining an annular gap;

permanent magnetic means having a permanent magnetic field for acting on the armature of a task unit with a holding force to hold the task unit on said holding device;

electromagnetic means for superposing an electromagnetic field on said permanent magnetic field when the task unit is transferred to or away from said holding device;

said electromagnetic means being seated in said annular gap and said electromagnetic field defining a magnetic field axis;

said permanent magnetic means defining magnetic poles and being seated in said gap so as to cause said magnetic poles to be aligned radially of said magnetic field axis; and, said armature and said flux-conducting member conjointly defining a contact engaging interface when said task unit is in position on said holding device so as to cause said flux-conducting member and said armature to define a completely closed magnetic circuit for the field lines of said electromagnetic field.

2. The holding device of claim 1, said permanent magnetic means being a single-piece ring-shaped permanent magnet having a radially polarized magnetic field and being seated in said annular gap.

3. The holding device of claim 1, said permanent magnetic means being a plurality of axially polarized individual magnets seated in said gap in radial alignment with respect to said magnetic field axis.

4. The holding device of claim 1, said permanent magnetic means having a first axial dimension and said electromagnetic means having a second axial dimension greater than said first axial dimension.

5. The holding device of claim 1, each of said task units being a probe pin of a coordinate measuring apparatus and incorporating said armature therein.

6. The holding device of claim 1, each of said task units being a probe head of a coordinate measuring apparatus and incorporating said armature therein.

7. A probe head of a coordinate measuring apparatus for interchangeably holding probe pins each having an armature so as to permit the probe pin to be held by magnetic force, the probe head comprising:

a holding member;

a displaceable part mounted in said holding member so as to be displaceable with respect thereto;

a holding device mounted in said displaceable part for engaging, holding and releasing the probe pin, the holding device including:

a flux-conducting member defining an annular gap;

permanent magnetic means having a permanent magnetic field for acting on the armature of a probe pin with a holding force to hold the probe pin on said holding device;

electromagnetic means for superposing an electromagnetic field on said permanent magnetic field when the probe pin is transferred to or away from said holding device;

said electromagnetic means being seated in said annular gap and said electromagnetic field defining a magnetic field axis;

said permanent magnetic means defining magnetic poles and being seated in said gap so as to cause said magnetic poles to be aligned radially of said field axis; and, said armature and said flux-conducting member conjointly defining a contact engaging interface when said probe pin is in position on said holding device so as to cause said flux-conducting member and said armature to define a completely closed magnetic circuit for the field lines of said electromagnetic field.

8. A probe head for a coordinate measuring apparatus for interchangeably holding a plurality of probe pins each having an exchange plate defining an armature, the probe head comprising:

a holding member;

a displaceable part defining a longitudinal axis and being mounted in said holding member so as to be displaceable with respect thereto;

resilient biasing means disposed in said displaceable part for generating a resilient biasing force;

an electromagnetic chuck mounted in said displaceable part so as to be movable along said axis and against said resilient biasing force;

the electromagnetic chuck including:

a flux-conducting part having a longitudinal axis and defining an annular gap;

permanent magnetic means having a permanent magnetic field for acting on the armature of a probe pin with a holding force to hold the probe pin on said chuck;

electromagnetic means for superposing an electromagnetic field on said permanent magnetic field to strengthen the latter when transferring a probe unit onto said chuck and for superposing an electromagnetic field on the permanent magnetic field in opposition thereto to weaken the latter when transferring the probe pin off said chuck;

said electromagnetic means being seated in said annular gap;

said permanent magnetic means defining magnetic poles and being seated in said gap so as to cause said magnetic poles to be aligned radially of said longitudinal axis of said flux-conducting part; and, said permanent magnetic means being stacked in said gap on top of said electromagnetic means so as to cause said permanent magnetic means to be directly adjacent said armature when the probe pin is held on said chuck.

9. The probe head of claim 8, said permanent magnetic means having a first axial dimension and said electromagnetic means having a second axial dimension greater than said first axial dimension.

10. The probe head of claim 8, said permanent magnetic means being a plurality of axially polarized individual magnets seated in said gap in radial alignment with respect to said longitudinal axis of said flux-conducting part.

11. The probe head of claim 8, said flux-conducting part and said armature conjointly defining a completely closed magnetic circuit for the lines of said electromagnetic field when said probe pin is held on said chuck.

* * * * *